United States Patent [19]
Gupta

[11] Patent Number: 5,925,323
[45] Date of Patent: Jul. 20, 1999

[54] CONCENTRATION AVERAGING DEVICE FOR IMPURITIES IN INDUSTRIAL AIR STREAM

[75] Inventor: Ajay Gupta, Ann Arbor, Mich.

[73] Assignee: Durr Environmental, Inc., Plymouth, Mich.

[21] Appl. No.: 08/855,847

[22] Filed: May 12, 1997

[51] Int. Cl.[6] .............................. F01N 3/10; B01D 50/00
[52] U.S. Cl. ........................ 422/173; 96/108; 96/121; 96/126; 422/177; 422/182
[58] Field of Search .................... 55/385.1; 95/90, 95/114, 115, 141; 96/110, 108, 111, 121, 126, 131, 133; 422/171, 173, 177, 182

[56] References Cited

U.S. PATENT DOCUMENTS

| | | | |
|---|---|---|---|
| 4,025,324 | 5/1977 | Stackhouse, Jr. et al. | 96/126 |
| 4,565,553 | 1/1986 | Nowack | 95/141 |
| 4,966,611 | 10/1990 | Schumacher et al. | 96/126 |
| 5,198,001 | 3/1993 | Knebel et al. | 95/141 |
| 5,444,029 | 8/1995 | Martin | 95/141 |
| 5,453,259 | 9/1995 | D'Souza | 95/148 |
| 5,567,229 | 10/1996 | Klobucar et al. | 95/141 |
| 5,628,819 | 5/1997 | Mestemaker et al. | 96/143 |
| 5,759,496 | 6/1998 | Hickman et al. | 422/171 |

*Primary Examiner*—Duane S. Smith
*Attorney, Agent, or Firm*—Howard & Howard

[57] ABSTRACT

The invention places a concentration averaging device in an inlet line leading to an air treatment system. The device includes an adsorbent material which has the quality of increasing its equilibrium concentration of impurities with increasing percentage or concentration of impurities in the air stream. In this way, the concentration device tends to "average" the amount of impurities in the air stream delivered to the air treatment system. When used on an oxidizer, as an example, this allows the use of smaller combustion chambers, and reduces the fuel requirements for operation of the system.

11 Claims, 2 Drawing Sheets

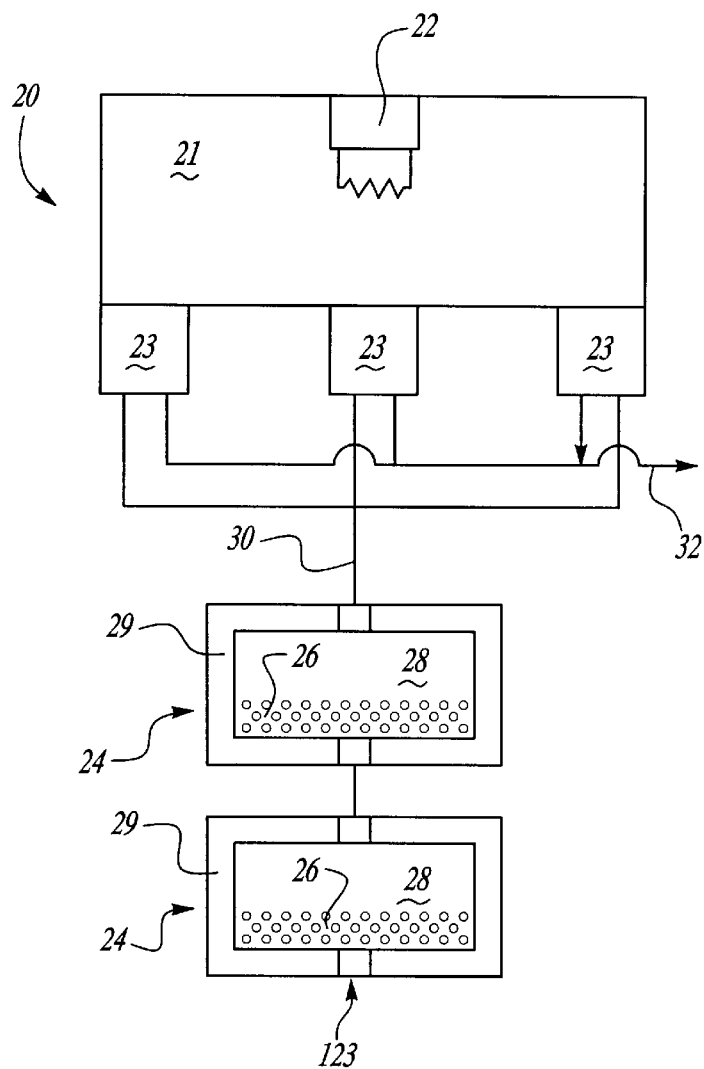
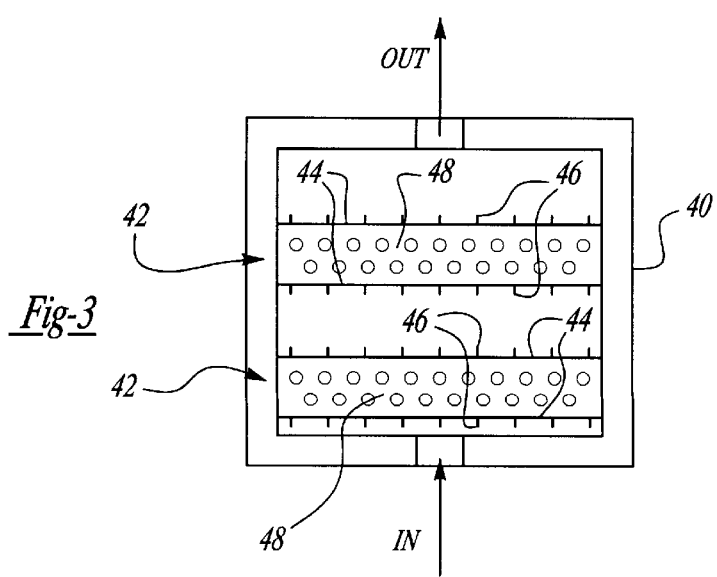

CONCENTRATION AVERAGING DEVICE FOR IMPURITIES IN INDUSTRIAL AIR STREAM

BACKGROUND OF THE INVENTION

This application relates to a method and apparatus for minimizing concentration fluctuations of the amount of impurities in an industrial air stream being sent to an air treatment system, such as an oxidizer, a recovery condenser, or a biofilter.

In the prior art, many industrial processes result in impurities in an industrial air stream. Air carrying the impurities must typically be sent to an air cleaning system to remove the impurities. One widely utilized type of system is an incinerator or oxidizer.

An example of the types of applications which may result in impurities being directed into the air stream is a paint spray booth wherein impurities are Volatile Organic Compounds (VOC) which escape into the air surrounding the paint spray booth as a result of the spraying process. Air carrying the VOC impurities is typically directed to an oxidizer, such as a regenerative thermal oxidizer, where the impurities are oxidized into water and carbon dioxide.

There are many challenges in the design and operation of such industrial oxidizers. One challenge relates to the load on the system. Typically, the air stream is directed into a combustion chamber, and a burner within the combustion chamber provides heat to oxidize compounds in the air stream. The air stream may pass through a heat exchanger on the way into the combustion chamber.

As the concentration of impurities in the air stream increases, the temperature within the combustion chamber increases accordingly. That is, as more impurities are burned within the combustion chamber, the temperature of the combustion chamber increases. As the temperature within the combustion chamber increases, the amount of fuel that must be sent to the burner to maintain the necessary combustion temperature within the combustion chamber decreases. If the concentration level in the inlet air stream increases to a particularly high level, the total heat in the combustion chamber may be above that necessary to maintain the combustion chamber temperature, even without any input from a burner. A heat rejection mechanism is then typically actuated to prevent heat build-up.

One heat rejection method is to upscale the oxidizer size so that in the event of unusually high concentration, clean air is introduced into the system to dilute the level of concentration in the industrial air stream. This method requires a relatively large oxidizer, which increases the cost of the oxidizer.

On the other hand, when the concentration of impurities in the air is relatively low, then the fuel requirement to the burner increases.

An oxidizer system which processes a fluctuating concentration level must be able to address both extremes. Thus, oxidizers are typically made larger than would otherwise be necessary, and more expensive. In addition, the amount of fuel required to maintain combustion at low concentration levels is also expensive.

Similarly, the design of other air treatment systems including condensers and biofilters is also affected by extreme fluctuations in the inlet concentrations.

For the above reasons, it would be desirable to maintain the level of concentration as close to a constant as is possible.

SUMMARY OF THE INVENTION

In a disclosed embodiment of this invention, a concentration averaging device (CAD) is placed in the industrial air stream on an inlet line leading to an air treatment device. The present invention utilizes an adsorption material in the inlet line. Preferably the adsorption material is placed within a fixed housing, and the air stream must pass through the adsorption material on its way to the combustion chamber or other treatment device.

This invention will be disclosed with reference to oxidizers. However, it must be understood that other air treatment devices such as condensers or biofilters for removing impurities from air would also benefit from this invention. Thus, the scope of the invention is not limited to oxidizers.

Applicant has recognized that the equilibrium adsorption ability of an adsorbent material at a particular temperature increases with increasing VOC concentration in the air stream directed across the adsorbent material. That is, the amount of VOC impurities in the adsorbent material, increases with increasing concentration of VOC impurities in the air stream. There is an equilibrium concentration at which the adsorbent material can no longer retain additional VOC's. This equilibrium concentration increases as the VOC concentration in the air increases. Thus, the inventive adsorbent material acts as a "averaging" unit to tend to average the amount of VOC concentration in the air at any moment. This feature is disclosed for VOC's but is believed to be true for organic compounds generally. While the CAD will not result in a true "average", it will tend to decrease fluctuations in the concentration of the air reaching the combustion chamber.

Various adsorbent materials may be utilized. Examples are carbon, zeolite, polymers or a mixture of known adsorbent materials. The adsorbent material can be in the form of pellets, or could be in the form of a matrix material, such as extruded, molded or deposited on a substrate. The geometry, thickness and size of the walls or thickness of the material is determined by expected concentration fluctuation frequency and amplitude, by the types of compounds that will be encountered, by the volume of air flow, and by the expected temperature and humidity levels. Further, a number of layers of concentration material may be utilized to assist in achieving an overall averaging of the flow.

BRIEF DESCRIPTION OF THE DRAWINGS

FIG. 1 schematically shows an oxidizer incorporating the inventive concentrator of this invention.

FIG. 3 shows another embodiment concentration averaging device.

DETAILED DESCRIPTION OF THE PREFERRED EMBODIMENT

Figure 2:
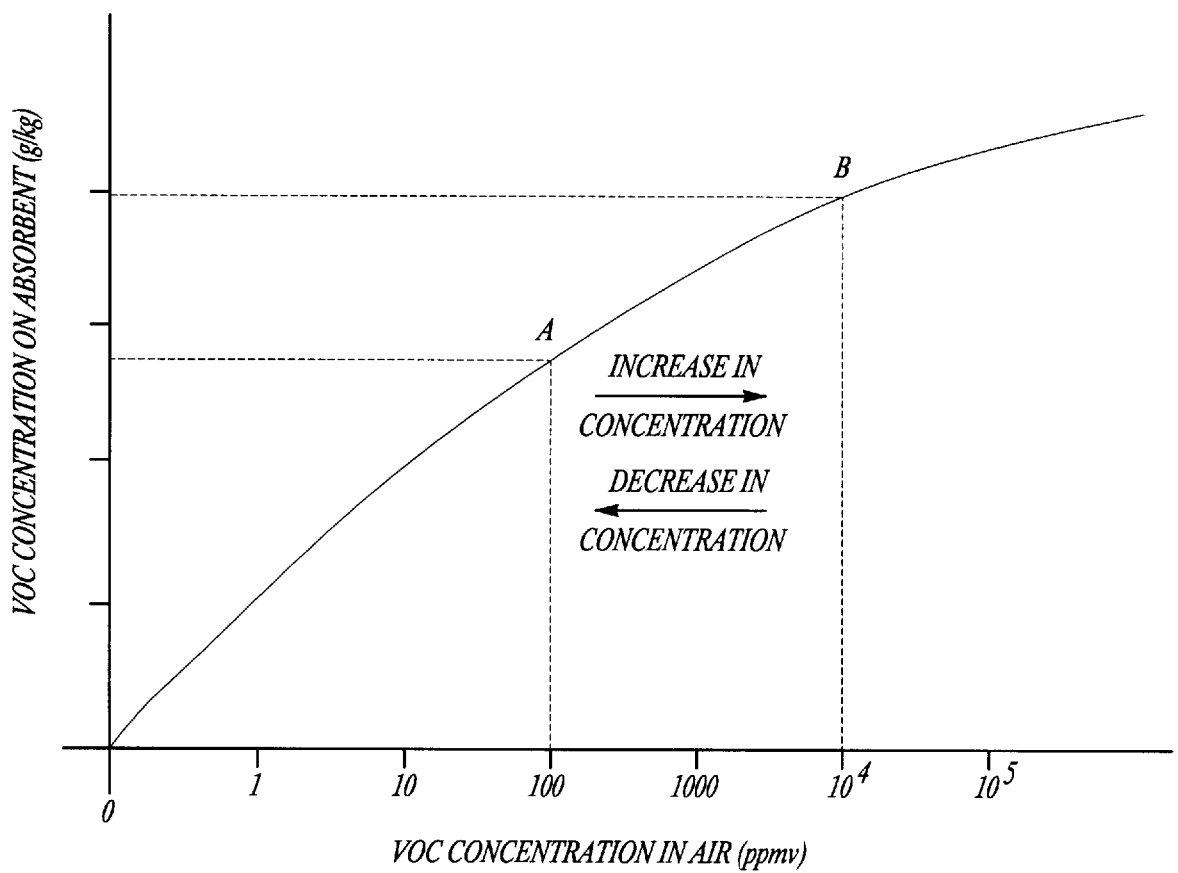
FIG. 2 is a graph of the equilibrium concentration in an adsorbent with changing concentration in the air flow.

FIG. 1 schematically shows an oxidizer system 20 incorporating a combustion chamber 21 having a burner 22. As described in the Background of the Invention section, such oxidizers may be of several types, including regenerative thermal oxidizers. The oxidizer is shown having three heat exchangers 23 leading into combustion chamber 21. Fuel is sent to the burner 22 to maintain a combustion temperature in the combustion chamber 21. Air enters from an air supply 123, and typically carries impurities which must be removed from the air stream by the oxidizer 20. The air stream 123 moves into a CAD 24, and as shown in this embodiment, leaves a first CAD 24 through a line 25 and enters a second CAD 24. CAD 24 each include an adsorbent material 26. In this disclosed embodiment, the adsorbent material is shown as pellets, however, other types of adsorbent material including blocks, or other matrix material may be utilized.

The adsorbent material is received in a chamber 28 in a fixed housing 29 that defines the concentrator. Although two distinct housings 29 are shown, by utilizing grids or supporting structure, it may be possible to have several layers of adsorbent material 26 within a single housing 29. Moreover, only a single layer may be necessary in some applications.

A flow line 30 leads from the most downstream CAD 24 through the heat exchangers 23, and into the combustion chamber 21. An outlet 32 leaves the combustion chamber 21.

The drawing is very schematic, and it should be understood that the oxidizer 20 can in fact be any of several types of oxidizers. As one example, a regenerative thermal oxidizer passes inlet gas cyclically over a heat exchanger, while at the same time passing heated gas from the combustion chamber which is clean over a second heat exchanger. The present invention would be applicable to such systems.

As shown in FIG. 2, Applicant has recognized that as the percentage of VOC's in the air increases, the equilibrium concentration of VOC's on the adsorbent also increases. At some point, an adsorbent material becomes saturated such that it can remove no further VOC's from the air stream. This is the equilibrium concentration, and it changes at any particular temperature.

The equilibrium curve shown in FIG. 2 is for a particular temperature. The graph shows a point A and a point B. Point A is at a process point when the VOC concentration in the air is 100 ppmv. At that point, the equilibrium adsorption is at a first lower level. At Point B, the VOC concentration in the air has increased to $10^4$ ppmv. As can be seen, the VOC concentration equilibrium concentration has also increased.

The present invention utilizes this phenomenon to create an "averaging" of the VOC concentrations in the air stream directed into the combustion chamber. In this way, the present invention allows the use of smaller oxidizers, less fuel, and lower costs for operating an oxidizer.

Stated another way, the adsorbent material can only remove a certain amount of impurities before it becomes saturated. However, the saturation amount increases as the concentration of impurities in the air increases. Thus, when the air entering through line 123 is of a relatively high impurity concentration (Point B), the adsorbent material 26 can remove more impurities. When there is a lower level of impurities in the air stream (Point A), the adsorbent material can only remove a lesser amount.

Thus, should there be an impurity concentration fluctuation such that there is a high Point B for a period of time, and the system then returns to a relatively low Point A, the impurities in the adsorbent between Point B and down to Point A will be carried to the combustion chamber along with the air at the relatively low concentration level A. The adsorbent can no longer "hold" the high level of impurities. In this way, the fuel which would previously have been required to maintain the combustion temperature for the low concentration level is no longer necessary. The additional impurities ensure a higher temperature in the combustion chamber.

On the other hand, if the system is operating at low level A of concentration, and there is a fluctuation up to level B, the adsorbent material will be able to remove a good deal of the additional impurities in the air due to its increased equilibrium ability.

FIG. 3 shows a CAD 40 in which adsorbent cartridges 42 are placed. Cartridges 42 are made of sheet metal walls 44 with holes 46 to allow air flow through the cartridges. Adsorbent materials 48, as disclosed above, are received within the cartridges.

The present invention thus utilizes a CAD which is able to remove volatile organic compounds. The CAD carries a type of adsorbent material which changes its equilibrium adsorption percentage dependent on the concentration of VOC's in the air stream. Carbon, zeolites, certain polymers known to those skilled in the art, or a combination of these are acceptable adsorbent materials.

Although, the specific disclosure is of a regenerative thermal oxidizer, it should be understood that many other types of oxidizers including recuperative thermal oxidizers, thermal oxidizers without heat recovery, catalytic oxidizers, etc. further, air treatment devices other than oxidizers, such as condensers or biofilters for removing impurities come within the scope of this invention.

A preferred embodiment of this invention has been disclosed, however, a worker of ordinary skill in the art would recognize that certain modifications would come within the scope of this invention.

I claim:

1. An air treatment system comprising:

a treatment device having a burner;

an inlet line carrying a source of industrial air with impurities to be removed to said device; and a concentration averaging device placed between said inlet line and said device, such that the gas passing through said inlet line and to said treatment device passes through said concentration averaging device carrying an adsorbent material which increases its equilibrium impurity concentration with increasing impurity concentration in the air stream passing through said inlet line.

2. A system as recited in claim 1, wherein said concentration averaging device is a fixed housing placed in said inlet line.

3. A system as recited in claim 2, wherein said adsorbent material is pelletized.

4. A system as recited in claim 2, wherein said material is in the form of a matrix.

5. A system as recited in claim 1, wherein said device is an oxidizer.

6. A system as recited in claim 1, wherein said system is utilized with an air stream carrying organic compounds.

7. A system as recited in claim 1, wherein said adsorbent material is received within a cartridge housing.

8. A system as recited in claim 1, wherein heat exchangers are placed between said treatment device and said concentration averaging device, a single inlet line leading to a plurality said heat exchangers, said concentrating averaging device being placed on said single inlet line, such that gas passing through each of said heat exchangers passes through said concentration averaging device.

9. A system as recited in claim 1, wherein an outlet line leads from said device, said outlet line not passing through said concentration averaging device.

10. An air treatment system comprising:

a treatment device having a burner, and having a plurality of heat exchangers leading into said burner;

an inlet line carrying a source of industrial air with impurities to be removed to said device; and a concentration averaging device placed between said inlet line and said device, such that the gas passing through said inlet line and to said treatment device passes through said concentration averaging device carrying an adsorbent material which increases its equilibrium impurity concentration with increasing impurity concentration in the air stream passing through said inlet line, with a single inlet line delivering gas to said plurality of heat exchangers, and said heat exchangers periodically switching between being in an inlet mode and an outlet mode such that gas passes through said concentration averaging device into a heat exchanger in an inlet mode, and then into said combustion chamber.

11. An air treatment as recited in claim 10, wherein an outlet line leads from said device, said outlet line not passing through said concentration averaging device.

* * * * *